(12) United States Patent
Kim et al.

(10) Patent No.: US 11,015,687 B2
(45) Date of Patent: May 25, 2021

(54) LINEAR ACTUATOR HAVING FREE FALL FUNCTION

(71) Applicant: HANWHA AEROSPACE CO., LTD., Changwon-si (KR)

(72) Inventors: Tae Ju Kim, Ansan-si (KR); Sae Bin Um, Suncheon-si (KR); Eun Soo Kim, Hwaseong-si (KR); Sang Joon Park, Cheonan-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 190 days.

(21) Appl. No.: 16/461,075

(22) PCT Filed: Sep. 8, 2017

(86) PCT No.: PCT/KR2017/009855
§ 371 (c)(1),
(2) Date: May 15, 2019

(87) PCT Pub. No.: WO2019/050066
PCT Pub. Date: Mar. 14, 2019

(65) Prior Publication Data
US 2019/0277379 A1    Sep. 12, 2019

(30) Foreign Application Priority Data
Sep. 7, 2017   (KR) .................. 10-2017-0114450

(51) Int. Cl.
*F16H 25/20* (2006.01)
*F16H 25/22* (2006.01)
*F16H 25/24* (2006.01)

(52) U.S. Cl.
CPC ......... *F16H 25/2025* (2013.01); *F16H 25/20* (2013.01); *F16H 25/2204* (2013.01);
(Continued)

(58) Field of Classification Search
CPC ............ F16H 25/2025; F16H 25/2266; F16H 25/2252; F16H 2025/2445; F16H 25/2454;
(Continued)

(56) References Cited

U.S. PATENT DOCUMENTS 2,701,478 A * 2/1955 Riess .................. F16D 7/10
74/89.38
8,505,399 B2 * 8/2013 Hirai .................. F16H 25/2454
74/39
(Continued)

FOREIGN PATENT DOCUMENTS

EP   2 202 870 A2   6/2010
EP   2 840 020 A2   2/2015
(Continued)

OTHER PUBLICATIONS

International Search Report dated May 29, 2018, issued in counterpart application No. PCT/KR2017/009855, w/ English translation(5 pages).

*Primary Examiner* — Jake Cook
*Assistant Examiner* — Gregory Robert Weber
(74) *Attorney, Agent, or Firm* — Westerman, Hattori, Daniels & Adrian, LLP

(57) ABSTRACT

A linear actuator having a free fall function. The linear actuator moves a piston-rod member back and forth using torque of a rotary motor. Here, the piston-rod member is disposed within a portion of a cylinder body to be movable back and forth. In the event of jamming in which the piston-rod member is stopped due to sticking between an operating nut and a screw member, the piston-rod member is caused to freely fall in a direction in which load is applied.

(Continued)

This can consequently obtain the maximum stretched length of the piston-rod member, thereby providing safety in an emergency.

8 Claims, 11 Drawing Sheets

(52) U.S. Cl.
CPC ..... *F16H 25/2252* (2013.01); *F16H 25/2266* (2013.01); *F16H 25/2454* (2013.01); *F16H 2025/2445* (2013.01)

(58) Field of Classification Search
CPC ... F16H 25/2015; F16H 25/205; B64C 25/30; B64C 25/20; B64C 25/24
See application file for complete search history.

(56) References Cited

U.S. PATENT DOCUMENTS

| | | | |
|---|---|---|---|
| 8,794,088 B2* | 8/2014 | Quenerch'Du | B64C 13/28 |
| | | | 74/89.39 |
| 10,751,789 B2* | 8/2020 | Gostylla | B23P 19/062 |
| 10,751,790 B2* | 8/2020 | Blacket | B21D 39/03 |
| 10,844,938 B2* | 11/2020 | Legrand | F16H 25/20 |
| 2013/0152717 A1* | 6/2013 | Kopecek | F16H 25/2015 |
| | | | 74/89.39 |

FOREIGN PATENT DOCUMENTS

| | | |
|---|---|---|
| EP | 2 855 261 A0 | 4/2015 |
| KR | 10-2015-0035812 A | 4/2015 |

* cited by examiner

LINEAR ACTUATOR HAVING FREE FALL FUNCTION

TECHNICAL FIELD

The present invention relates to a linear actuator having a free fall function. More particularly, the present invention relates to a linear actuator having a screw structure, the linear actuator providing a free fall function by which a piston rod can freely fall in a direction in which load is applied in the event of jamming caused by sticking between a screw member and an operating nut.

BACKGROUND ART

In general, a linear actuator refers to an actuator creating a linear reciprocal movement. Such linear actuators are used in a variety of industrial fields. For example, a linear actuator may be used in a mechatronics machine or an industrial robot to provide a linear motion. In addition, a linear actuator may be used in a machine tool or an ultra-precision measurement device performing a transport or cutting operation for fabrication of advanced precision products, such as semiconductors, liquid crystal displays (LCDs), and hard disk drives (HDDs).

Linear actuators may have a structure using a screw rotated using a motor, a rack and a pinion structure, and the like.

A linear actuator using a screw may be configured such that a screw rotated by a motor extends through and is screw coupled to a movable body that is movable back and forth. The movable body is moved back and forth in response to rotation of the screw.

FIG. 1 is a cross-sectional view illustrating a linear actuator of the related art. Referring to the structure of the linear actuator illustrated in FIG. 1, a piston rod 2 is provided within a portion of a cylinder 1 to be moved back and forth by rotation of a motor 1a.

A screw 3 is provided within the cylinder 1 in the longitudinal direction. The screw 3 is rotated by torque transferred from the motor 1a to move the piston rod 2 linearly back and forth. The piston rod 2 is provided with a movable nut 4 fitted around the screw 3, with the screw 3 extending through the movable nut 4.

The piston rod 2 is provided with the movable nut fitted around the screw 3, with the screw 3 extending through the movable nut 4. The piston rod 2 linearly moves back and forth within a portion of the cylinder body 1, depending on the direction of rotation of the screw 3.

However, in the linear actuator of the related art, when jamming in which connecting portions of the screw 3 and the movable nut 4 are stuck occurs, the movable nut 4 hinders rotation of the screw 3, so that the piston rod 2 cannot move in a forward direction whereby the piston rod 2 is stretched or in a backward direction whereby the piston rod 3 is compressed.

When the piston rod 2 cannot move due to jamming in which the screw 3 and the movable nut 4 are stuck, operation of devices using such a linear actuator is stopped. For example, linear motion of a mechatronics machine or an industrial robot is stopped, and operation of a machine tool or an ultra-precision measurement device performing transport or cutting operations for fabrication of advanced precision products, such as semiconductors, liquid crystal displays (LCDs), and hard disk drives (HDDs), is stopped.

Such a linear actuator may be used to protrude and retract the landing gear of an aircraft. In the case in which a linear actuator is used to protrude and retract the landing gear of an aircraft, when the piston rod 2 is unable to move due to jamming in which the screw 3 and the movable nut 4 are suck, a disaster may be caused.

DISCLOSURE

Technical Problem

Accordingly, the present invention has been made keeping in mind the above problems occurring in the prior art, and an object of the present invention is to provide a linear actuator having a free fall function. When the operation of a piston-rod member of the linear actuator is stopped due to jamming, the free fall function allows the piston-rod member to move by freely falling in a direction in which load is applied, thereby guaranteeing safety in an emergency.

Technical Solution

In order to accomplish the above object, the present invention may provide a linear actuator including: a screw member rotatably provided within a cylinder body having a cylinder chamber therein; an operating nut extending around and screw coupled to the screw member, the operating nut being moved back and forth by rotation of the screw member; a piston-rod member separably coupled to the operating nut within the cylinder chamber and protruding from one portion of the cylinder body, the piston-rod member being moved back and forth integrally with the operating nut; and a rotary motor disposed on the cylinder body to rotate the screw member. When the operating nut and the screw are stuck to and rotate integrally with each other, the piston-rod member is decoupled from the operating nut to advance in a direction in which load is applied.

The piston-rod member may include a piston portion linearly moving in contact with an inner wall of the cylinder chamber and a rod portion having a diameter smaller than a diameter of the piston portion and protruding through one portion of the cylinder chamber. A nut receptacle may be provided within the piston portion, with the operating nut being separably coupled to the nut receptacle, and a screw receptacle may be provided within the rod portion to communicate with the nut receptacle, the screw receptacle allowing one end portion of the screw member to be inserted thereinto. A key member may be provided on an outer circumferential surface of the operating nut and located to be caught by an inner circumferential surface of the nut receptacle, the key member being released from a caught position when the operating nut and the screw member are fixed to and rotate integrally with each other.

A first key insertion recess may be provided in the inner circumferential surface of the nut receptacle, with one end portion of the key member being inserted into the first key insertion recess portion, and is located such that one end thereof is inserted into the first key insertion recess portion and the other end thereof supports the outer circumferential surface of the operating nut. A second key insertion recess may be provided in the outer circumferential surface of the operating nut, allowing the other end of the key member to be inserted thereinto when the operating nut 300 rotates. When the operating member is rotated integrally with the screw member, so that the other end portion is located in the second key insertion recess, one end portion of the key member may be pushed and released from the first key insertion recess and the other end portion of the key member is inserted into the second key insertion recess.

The operating nut may be provided with a key elastic support elastically supporting the key member by pushing the key member in a direction of the other portion, the key elastic support including a spring provided on the outer circumferential surface of the operating nut and inserted into a spring receptacle open in the direction of the other portion and a key-supporting washer in close contact with the key member and elastically supported by the spring.

The key member may include a first slope provided on a surface of the other portion thereof and a second slope corresponding to the first slope and provided on a surface of the first key insertion recess facing the first slope. The key member can be pushed and moved along the second slope when the piston-rod member or the operating nut is subjected to force in an advancing or retreating direction.

The operating nut may be located within the nut receptacle to be spaced apart from the piston portion. Rotary roller members may be rotatably located between the operating nut and the nut receptacle, the rotary roller members being screw-coupled to the outer circumferential surface of the operating nut and the inner circumferential surface of the nut receptacle.

A first thread portion may be provided on an outer circumferential surface of each of the rotary roller members, a second thread portion may be provided on an inner circumferential surface of the nut receptacle to be screw-coupled to the first thread portion, and a third thread portion may be provided on the outer circumferential surface of the operating nut to be screw-coupled to the first thread portion. The rotary roller members may be screw-coupled to the outer circumferential surface of the operating nut and the inner circumferential surface of the nut receptacle.

The linear actuator may further include a load-locking unit fixing a position of the piston-rod member in a position in which the piston-rod member has freely fallen and advanced in the direction in which load is applied.

The load-locking unit may be configured to catch and fix the piston-rod member when the piston-rod member is in contact with one end portion of the cylinder body and is stretched a maximum length after having freely fallen.

The load-locking unit may include a load-locking catch member provided on one end portion of the cylinder body, the load-locking catch member being elastically supported by a spring such that the load-locking catch member is able to protrude to an inner circumferential surface of a load hole through which the rod portion extends. The rod portion may include a rod-locking catch recess configured to catch the rod-locking catch member inserted thereinto.

Advantageous Effects

According to the present invention, in the event of jamming in which the piston-rod member is stopped due to sticking between the operating nut and the screw member, the piston-rod member can freely fall in a direction in which load is applied. This can obtain the maximum stretched length of the piston-rod member, thereby providing safety in an emergency.

In particular, the present invention can be applied to a linear actuator configured to protrude and retract a landing gear of an aircraft. In the event of jamming, the maximum stretched length of the piston-rod member 400 can be obtained, so that the landing gear main remain in the protruding position. This can consequently prevent a disaster from being caused by the malfunction of the landing gear, thereby significantly improving the reliability of the aircraft.

DESCRIPTION OF THE REFERENCE NUMERALS IN THE DRAWINGS

Figure 1:
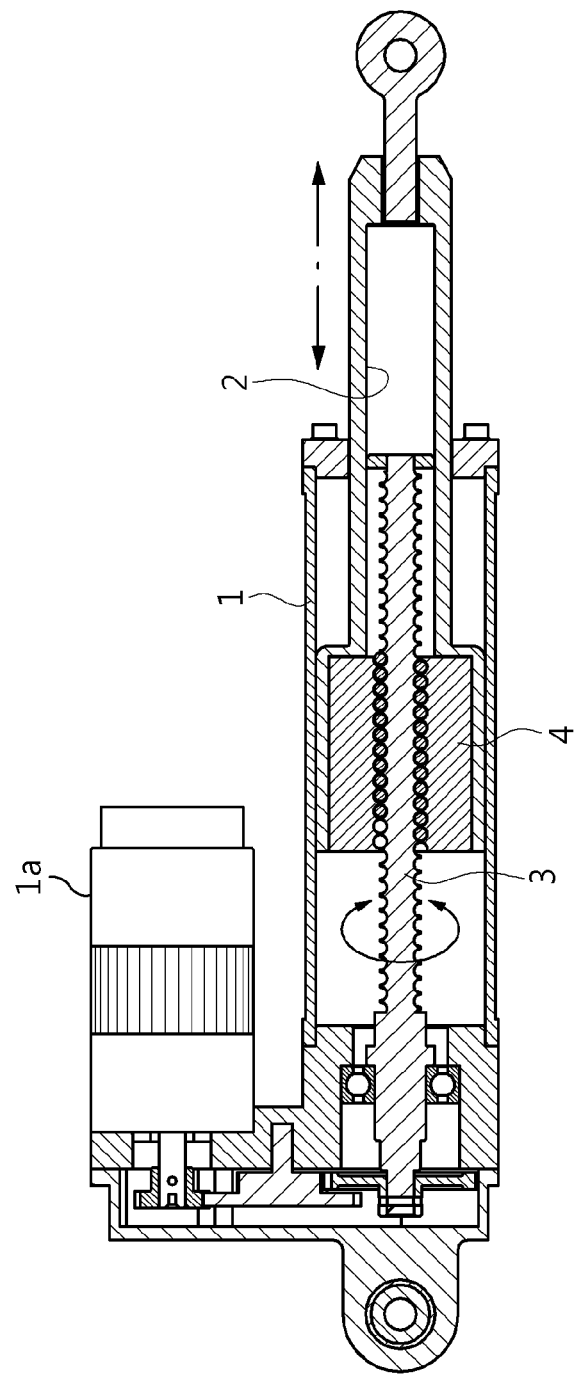
FIG. 1 is a cross-sectional view illustrating a structure of a linear actuator of the related art.

1: cylinder 2: piston rod
3: screw 4: movable nut
100: cylinder body 100*a*: cylinder chamber
200: screw member 200*a*: ball
300: operating nut 310: second key insertion recess
320: third thread portion 400: piston-rod member
400*a*: connector 410: piston portion
411 nut receptacle 411*a*: first key insertion recess
411*b*: second slope 411*c*: second thread portion
420: rod portion 421: screw receptacle
422: rod-locking catch recess 430: stepped portion
440: screw support piston portion 450: piston key member
451: piston guide recess 500: rotary motor
600: gear structure 700: key member
710: first slope 800: key elastic support
800*a*: spring receptacle 810: spring
820: key-supporting washer 900: rotary roller member
910: first thread portion 1000: load-locking unit 1100: load-locking catch member

MODE FOR INVENTION

The present invention will be described in more detail.

Exemplary embodiments of the present invention will be described in detail with reference to the accompanying drawings. Before the detailed description of the present invention, it should be understood that interpretation of terms or words used in this specification and claims, which will be described hereinafter, is not limited to their conventional meanings or those defined in dictionaries. Accordingly, the following embodiments described in this specification and configurations illustrated in the drawings are merely exemplary embodiments of the present invention but do not limit the technical idea of the present invention. It should therefore be understood that a variety of equivalents and modifications of the embodiments of the present invention could be made at a point in time when the present application was filed.

Figure 2:
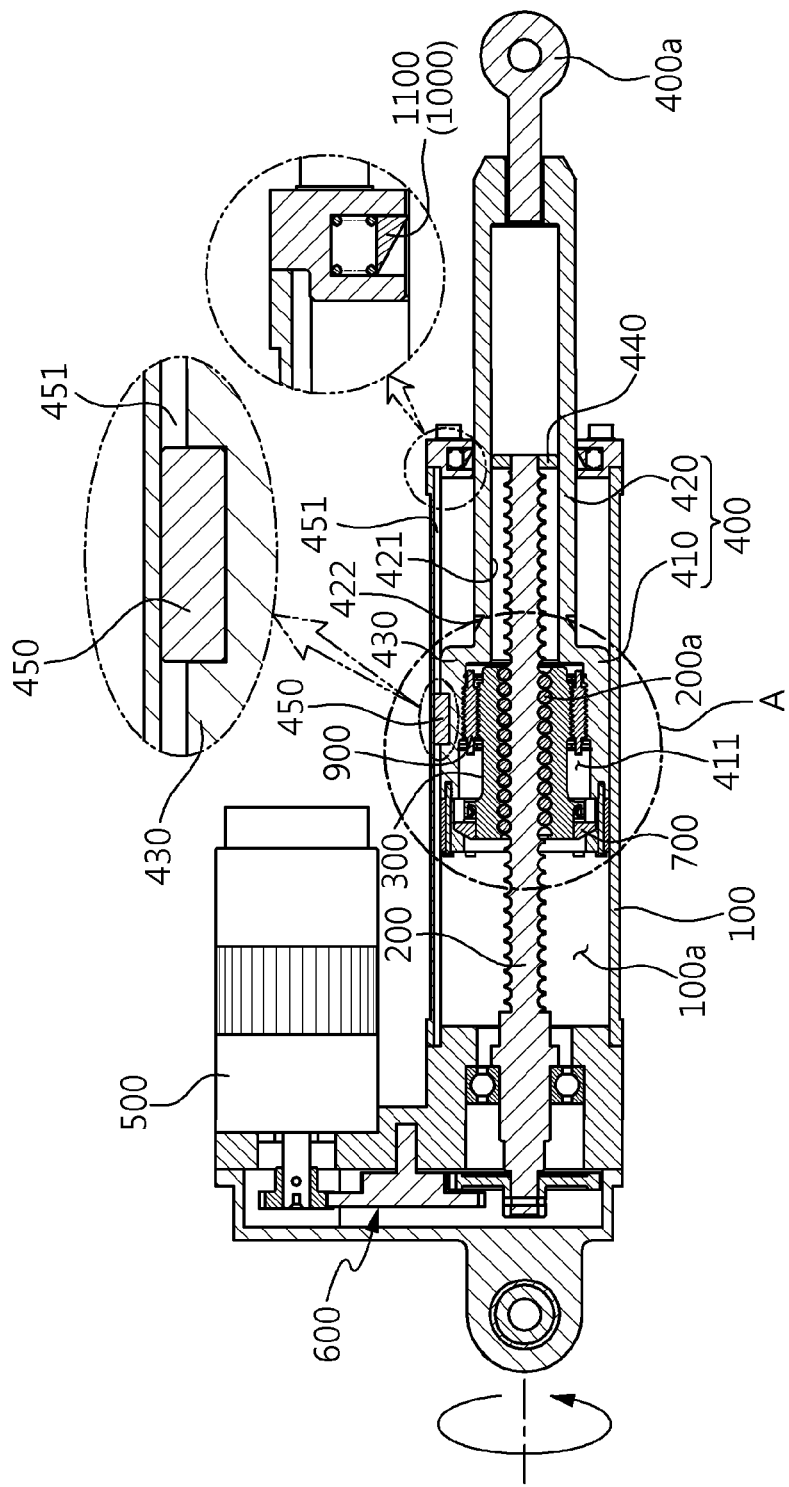
FIG. 2 is a cross-sectional view illustrating an embodiment of a linear actuator having a free fall function according to the present invention.
Figure 3:
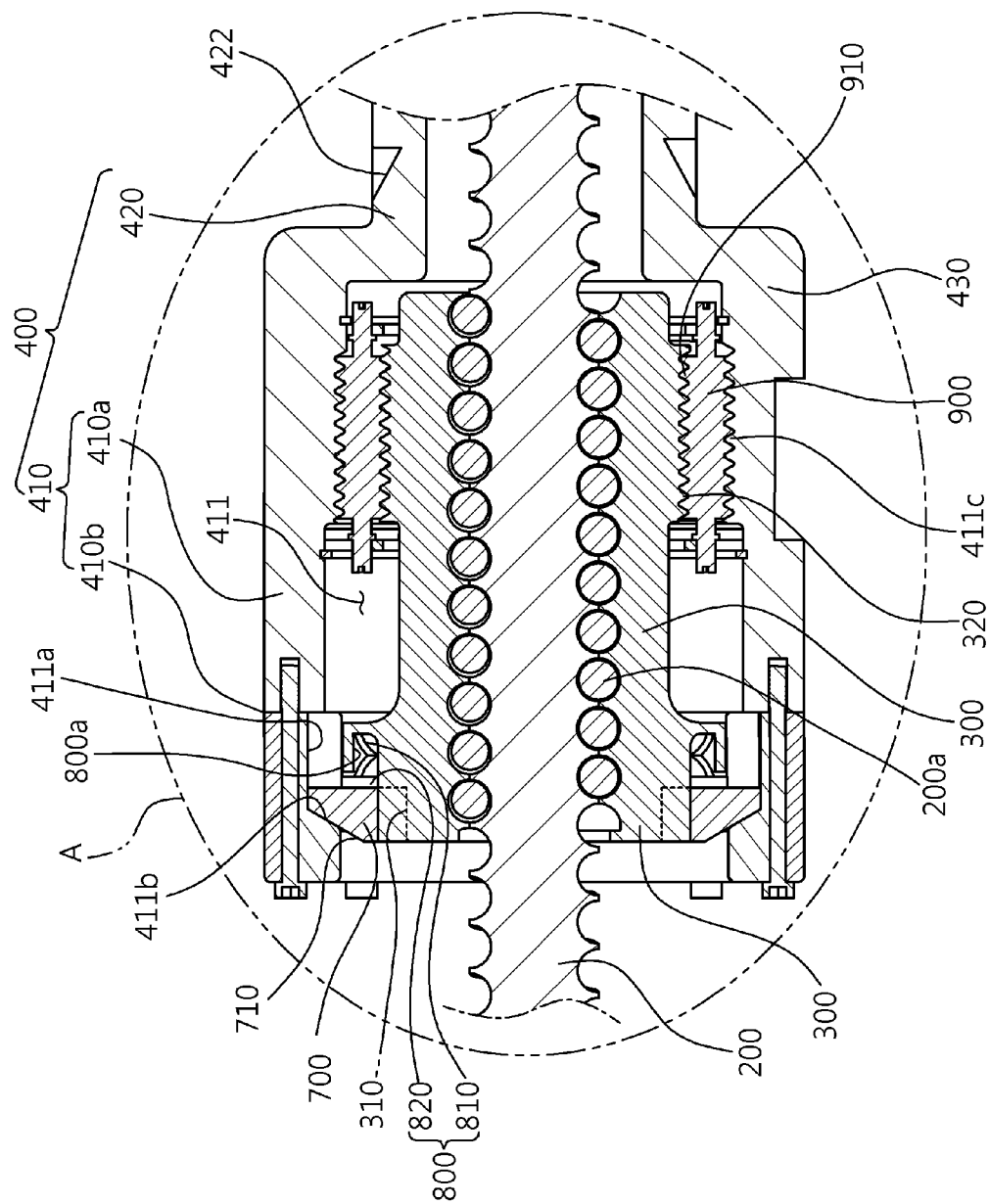
FIG. 3 is an enlarged cross-sectional view of the key portions designated with A in FIG. 2.
Figure 4:
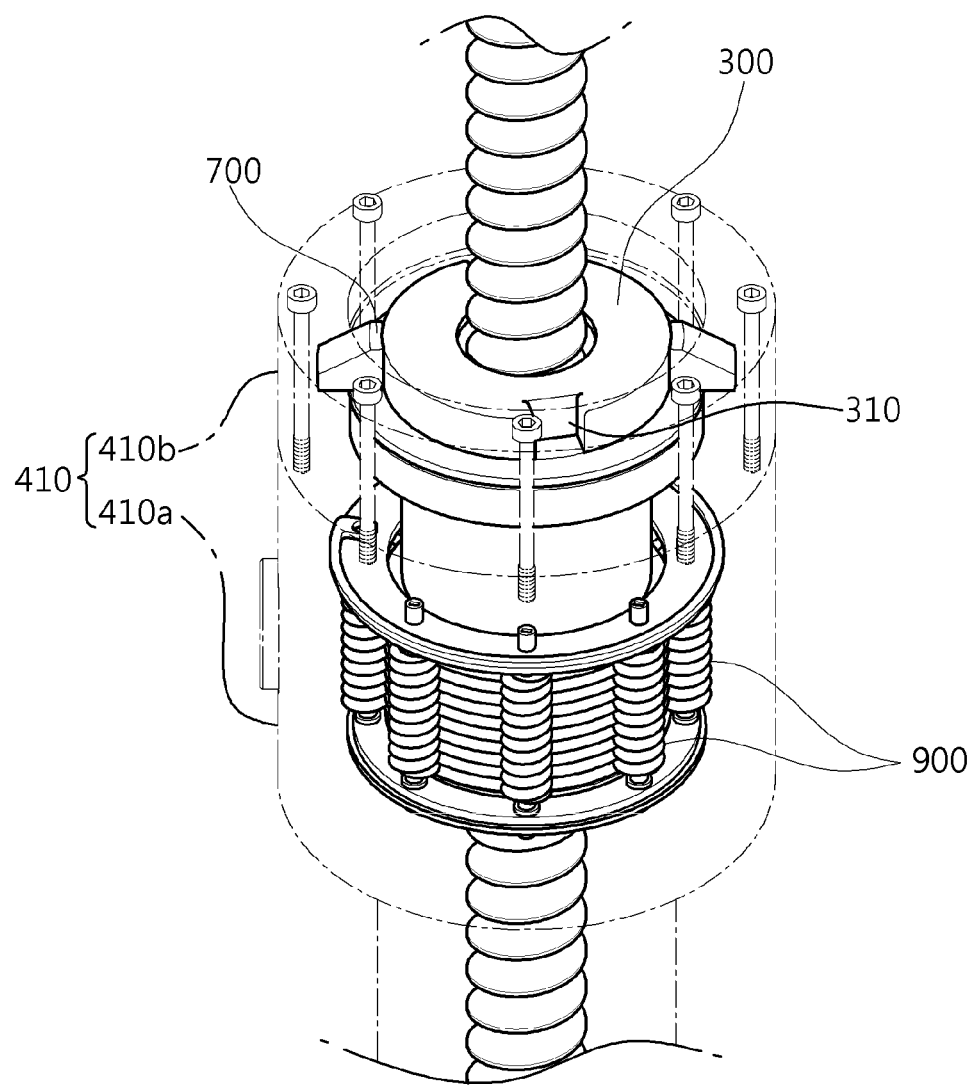
FIG. 4 is an enlarged perspective view of the embodiment of the linear actuator having a free fall function according to the present invention.

FIG. 2 is a cross-sectional view illustrating an embodiment of a linear actuator having a free fall function according to the present invention, FIG. 3 is an enlarged cross-sectional of illustrating the key portions designated with A in FIG. 2, and FIG. 4 is an enlarged perspective view illustrating the key portions, by which a piston rod is caused to freely fall in the event of jamming, in the embodiment of the linear actuator having a free fall function according to the present invention.

Hereinafter, the embodiment of the linear actuator having a free fall function according to the present invention will be described in more detail with reference to FIGS. 2 to 4.

The linear actuator having a free fall function according to the present invention is a linear actuator that moves a piston-rod member 400 back and forth using torque of a rotary motor 500. Here, the piston-rod member 400 is disposed within a portion of a cylinder body 100 to be movable back and forth. When the piston-rod member 400 is stopped during rotation of the rotary motor 500, the piston-rod member 400 is caused to freely fall in a direction in which load is applied.

More specifically, a cylinder chamber 100a guiding a linear movement is provided within the cylinder body 100.

The cylinder chamber 100a is configured to be open through one portion of the cylinder body 100. The piston-rod member 400 is located within the cylinder chamber 100a to protrude from the open portion such that the piston-rod member 400 is linearly movable.

A connector 400a is provided on an end portion of the piston-rod member 400 protruding from one portion of the cylinder body 100. The connector 400a is connected to an operating body that is actuated by the linear actuator according to the present invention.

The connector 400a may be modified into a variety of known structures connected to the operating body, which is operated by a linear movement transferred thereto from the piston-rod member 400. One portion of the piston-rod member 400 is connected to the operating body such that load is applied to the piston-rod member 400, so that the piston-rod member 400 can freely fall due to the load of the operating body.

In addition, a screw member 200 is rotatably provided in the longitudinal direction within the cylinder body 100, i.e. the cylinder chamber.

In addition, the rotary motor 500 for rotating the screw member 200 is provided on the other portion of the cylinder body 100. The torque of the rotary motor 500 is transferred to the screw member 200 via a gear structure 600 including a plurality of gears.

It should be understood that the gear structure 600 may be variously modified using a known gear structure, in consideration of a direction in which the shaft of the rotary motor 500 is disposed and a reduction ratio.

The screw member 200 extends through and is screw coupled to an operating nut 300. The screw member 200 is rotated at a fixed position to move the operating nut 300 back and forth.

The operating nut 300 extends around and is screw coupled to the screw member 200. When the screw member 200 is rotated forward, the operating nut 300 advances or moves forwards in the direction of one portion of the cylinder body 100. When the screw member 200 is rotated backward, the operating nut 300 retreats or moves backwards in the direction of the other portion of the cylinder body 100.

The term "advancement" used herein means that the piston-rod member 400 protrudes and is stretched from one portion of the cylinder body 100, while the term "retreat" used herein means that the piston-rod member 400 is compressed while being retracted into the cylinder body 100.

An embodiment of the screw member 200 is configured as a ball screw having balls 200a provided between the screw member 200 and the operating nut 300.

The ball screw is used to convert rotation into a linear motion. A detailed description of the ball screw will be omitted, since the ball screw has a known structure in which the balls 200a are provided between male threads and female threads.

The piston-rod member 400 includes a piston portion 410 linearly moving in contact with the inner wall of the cylinder chamber 100a and a rod portion 420 having a diameter smaller than the diameter of the piston portion 410 and protruding through one portion of the cylinder chamber 100a.

A piston key member 450 guiding a linear movement protrudes from an outer circumferential surface of the piston-rod member 400, i.e. an outer circumferential surface of the piston portion 410. A linear piston guide recess 451 is provided in the inner wall of the cylinder chamber 100a in the longitudinal direction, such that the piston key member 450 is inserted into the linear piston guide recess 451.

The piston key member 450 is inserted into the piston guide recess 451 and moves in the longitudinal direction of the cylinder body 100, thereby guiding linear reciprocal movement, i.e. advancement and retreat, of the piston-rod member 400.

In addition, a nut receptacle 411 is provided within the piston portion 410, with the operating nut being is separably coupled to the nut receptacle 411. A screw receptacle 421 is provided within the rod portion 420 to communicate with the nut receptacle 411. The screw receptacle 421 allows one end portion of the screw member 200 to be inserted thereinto.

The nut receptacle 411 is provided as a space having an inner diameter greater than that of the screw receptacle 421. A stepped portion is provided at a boundary between the nut receptacle 411 and the screw receptacle 421, such that the operating nut 300 is caught by the stepped portion.

In addition, a screw support piston 440 is provided within the rod portion 420 to support one end portion of the screw member 200, be in contact with the inner circumference surface of the rod receptacle, and guide movement of the piston-rod member 400.

One end portion of the screw member 200 is inserted into the nut receptacle 411 through the operating nut 300 to be connected to and supported by the screw support piston portion 440. The other end portion of the screw member 200 is supported and rotatably located by a ball bearing on the other end portion of the cylinder body 100, and is connected to the rotary motor 500 via a gear structure.

The operating nut 300 is inserted into the nut receptacle 411 to be separably coupled to the piston-rod member 400.

The piston-rod member 400 is screw coupled to the operating nut 300 to linearly move as a unitary body with the operating nut 300.

That is, when the operating nut 300 is advanced or retreated by rotation of the rotary motor 500, the piston portion 410 advances or retreats integrally with the operating nut 300.

The operating nut 300 is separably coupled to the piston-rod member 400 via a free fall structure including a key member 700 and rotary roller members 900. In the event of jamming in which the operating nut 300 and the screw member 200 are stuck to and rotate integrally with each other, the free fall structure moves the piston-rod member 400 in a direction in which load is applied, so that the piston-rod member 400 can be stretched toward one end of the cylinder body 100 to a maximum degree.

In the event of jamming, the piston-rod member 400 can be separated from the operating nut 300 depending on the position while moving in a direction in which the load of the operating body is applied.

In the event of jamming, the piston-rod member 400 can move in a direction in which the load of the operating body is applied, i.e. in the direction of one end on which the connector 400a connected to the operating body is provided, so as to be stretched a maximum length from one portion of the cylinder body 100.

That is, when the operating nut 300 and the screw member 200 are stuck to and rotate integrally each other, the piston-rod member 400 is decoupled from the operating nut 300, and is caused to move in a direction in which the load is applied, by the load of the operating body.

More specifically, the key member 700 protrudes from an outer circumferential surface of the operating nut 300 and is located to be caught by an inner circumferential surface of the nut receptacle 411. The key member 700 can be released from a caught position when the operating nut 300 and the screw member 200 are stuck to and rotate integrally with each other.

In addition, in the caught position of the key member 700, the piston-rod member 400 moves back and forth integrally with the operating nut 300 coupled thereto. When the key member 700 is be released from the caught position as the operating nut 300 and the screw member 200 are stuck to and rotate integrally with each other, the piston-rod member 400 is decoupled from the operating nut 300, and is caused to move in a direction in which the load is applied, by the load of the operating body connected to one end portion thereof.

A first key insertion recess 411a is provided in the inner circumferential surface of the nut receptacle 411, with one end portion of the key member 700 being inserted into the first key insertion recess portion 411a. In addition, the key member 700 is located such that one end thereof is inserted into the first key insertion recess portion 411a and the other end thereof supports the outer circumferential surface of the operating nut 300.

A second key insertion recess 310 is provided in the outer circumferential surface of the operating nut 300, allowing the other end portion of the key member 700 to be inserted thereinto when the operating nut 300 rotates. When the other end portion of the key member 700 adjoins the second key insertion recess 310 in response to the operating nut 300 rotating integrally with the screw member 200, one end portion of the key member 700 is pushed and released from the first key insertion recess 411a and the other end portion of the key member 700 is inserted into the second key insertion recess 310.

The piston portion 410 may include a piston body 410a provided integrally with the rod portion 420 and an annular piston ring body 410b coupled to an end portion of the piston body 410a via bolt engagement. The piston ring body 410b has the first key insertion recess 411a in an inner circumferential surface thereof.

The operating nut 300 is provided with a key elastic support 800 elastically supporting the key member 700 by pushing the key member 700 in the direction of the other portion. The key elastic support 800 is provided on the outer circumferential surface of the operating nut 300. The key elastic support 800 may include a spring 810 inserted into a spring receptacle 800a open in the direction of the other portion and a key-supporting washer 820 in close contact with the key member 700 and elastically supported by the spring 810.

The key-supporting washer 820 and the spring receptacle 800a are spaced apart from each other. When the spring 810 is compressed, the spring receptacle 800a may function as a stopper supporting the key-supporting washer 820 to limit movement of the key member 700.

A first slope 710 is provided on the surface of the other portion of the key member 700. A second slope 411b corresponding to the first slope 710 is provided on a surface of the first key insertion recess 411a facing the first slope 710. When the piston-rod member 400 or the operating nut 300 is subjected to force in an advancing or retreating direction, the key member 700 can be pushed and moved along the second slope 411b.

In addition, the operating nut 300 may be located within the nut receptacle 411 to be spaced apart from the piston portion 410, and the rotary roller members 900 may be rotatably located between the operating nut 300 and the nut receptacle 411. The rotary roller members 900 are screw-coupled to the outer circumferential surface of the operating nut 300 and the inner circumferential surface of the nut receptacle 411.

According to an embodiment, a plurality of rotary roller members 900 may be provided around the operating nut 300, such that the roller members 900 are spaced apart from each other, and opposite ends of each of the rotary roller members 900 are rotatably supported to the piston portion 410. That is, the nut receptacle 411 may be provided a pair of roller supporting portions in the inner circumferential surface thereof, with both ends of the rotary roller members 900 being rotatably connected to the roller supporting portions.

It should be understood that both ends of the rotary roller members 900 may be rotatably supported to the outer circumferential surface of the operating nut 300.

More specifically, a first thread portion 910 is provided on an outer circumferential surface of each of the rotary roller members 900, a second thread portion 411c is provided on an inner circumferential surface of the nut receptacle 411 to be screw-coupled to the first thread portion 910, and a third thread portion 320 is provided on the outer circumferential surface of the operating nut 300 to be screw-coupled to the first thread portion 910.

The rotary roller members 900 are screw-coupled to the outer circumferential surface of the operating nut 300 and the inner circumferential surface of the nut receptacle 411.

In the event of jamming, the rotary roller members 900 allow the key member 700 to be smoothly pushed and moved to be released from the first key insertion recess 411a and be inserted into the second key insertion recess 310.

In addition, in a position in which no jamming has occurred, when torque necessary for rotation of the operating nut 300 is smaller than minimum torque necessary for linear motion of the operating nut 300, the torque necessary for rotation of the operating nut 300 is increased by force applied to the key member 700 as the operating nut 300 rotates. Consequently, the operating nut 300 linearly moves.

In addition, the linear actuator having a free fall function according to the present invention may further include a load-locking unit 1000 fixing the piston-rod member 400 in a position in which the piston-rod member 400 has freely fallen and advanced in the direction in which load is applied.

When the piston-rod member 400 advances ordinarily, the load-locking unit 1000 does not lock the position of the piston-rod member 400. In the event of jamming, when the piston-rod member 400 has freely fallen and arrived at a top dead point, i.e. when the piston portion 410 is in contact with one end portion of the cylinder body 100, the load-locking unit 1000 fixes the position of the piston-rod member 400 so that the piston-rod member 400 can remain in a stretched position.

The operation of the rotary motor 500 is controlled by an actuator operation controller, which controls the operation of the rotary motor 500 so that the rotary motor 500 moves back and forth within a preset range.

In addition, the range of movement of the piston-rod member 400 is set to be a range in which the piston portion 410 does not collide against both ends of the cylinder body 100, i.e. a range in which the piston portion 410 is spaced apart from both ends of the cylinder body 100. This is because, when the piston-rod member 400 collides against both ends of the cylinder body 100, malfunction or fracture may be caused by impact occurring during the collision.

In an embodiment, the load-locking unit 1000 may be configured to catch and fix the piston-rod member 400 when the piston-rod member 400 arrives at a maximum top dead point, i.e. the piston-rod member 400 is in contact with one end portion of the cylinder body 100 and is stretched a maximum length, after having freely fallen.

For example, the load-locking unit 1000 may include a load-locking catch member 1100 provided on one end portion of the cylinder body 100. The load-locking catch member 1100 is elastically supported by a spring such that the load-locking catch member 1100 can protrude to an inner circumferential surface of a load hole through which the rod portion 420 extends. The rod portion 420 may include a rod-locking catch recess 422 configured to catch the rod-locking catch member 1100 inserted thereinto when the piston portion 410 is in contact with one end portion of the cylinder body 100.

That is, when the piston portion 410 collides against one end portion of the cylinder body 100 due to the free fall of the piston-rod member 400, the load-locking catch member 1100 fixes the position of the piston-rod member 400, which is inserted into the rod-locking catch recess 422 and stretched.

Although not shown, it should be understood that the load-locking unit 1000 may be modified into various forms using another locking structure known in the art. In the event of jamming, the locking structure fixes the position of the stretched piston-rod member 400 by detecting an occurrence of jamming or detecting an arrival of the piston-rod member 400 at a maximum top dead point, i.e. a contact of the piston-rod member 400 with one end portion of the cylinder body 100, after a free fall.

Figure 5:
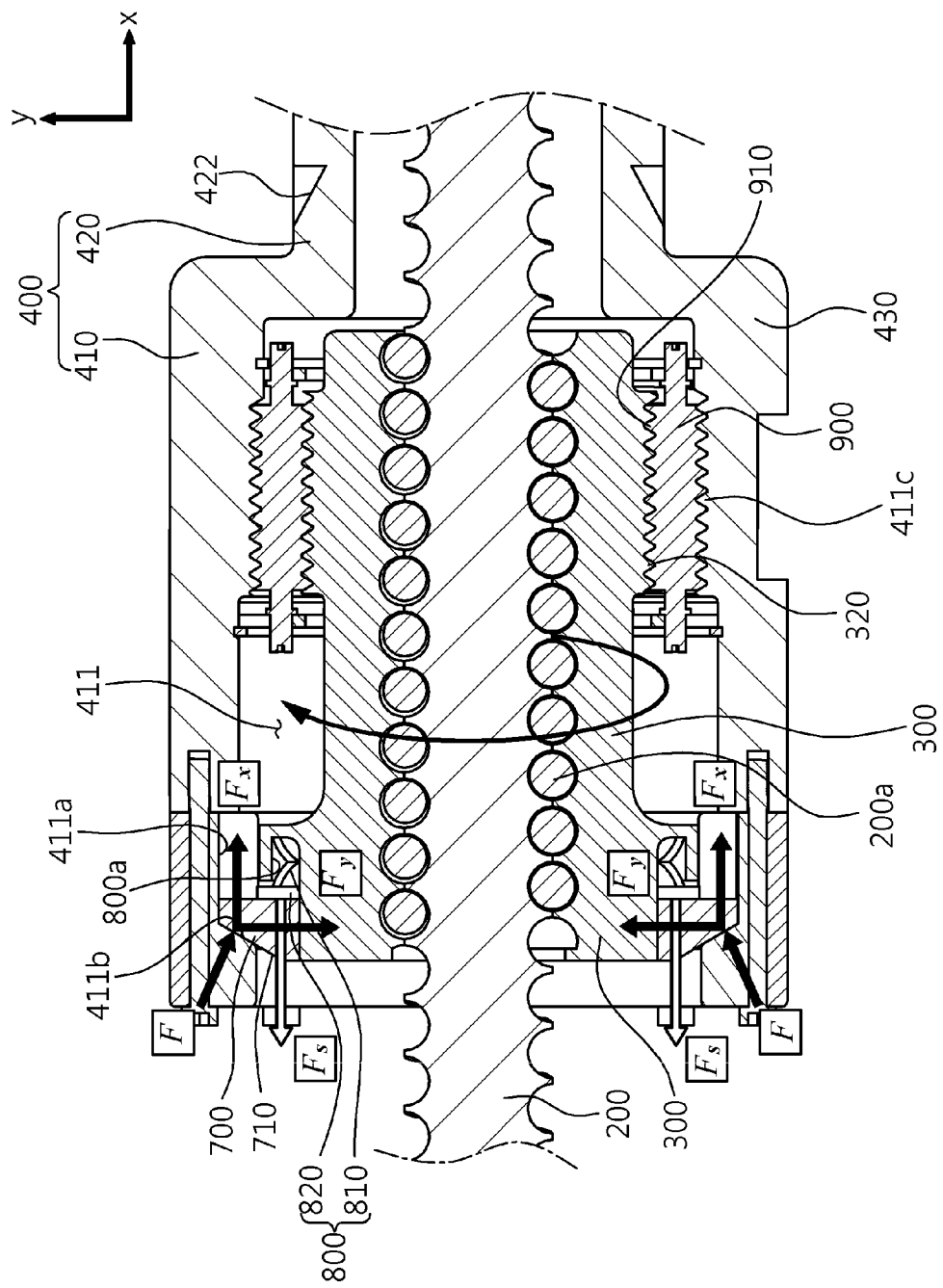
FIG. 5 is an enlarged cross-sectional view of the key portions in the embodiment of the linear actuator having a free fall function according to the present invention, illustrating an embodiment when the piston-rod member is stretched after jamming.
Figure 7:
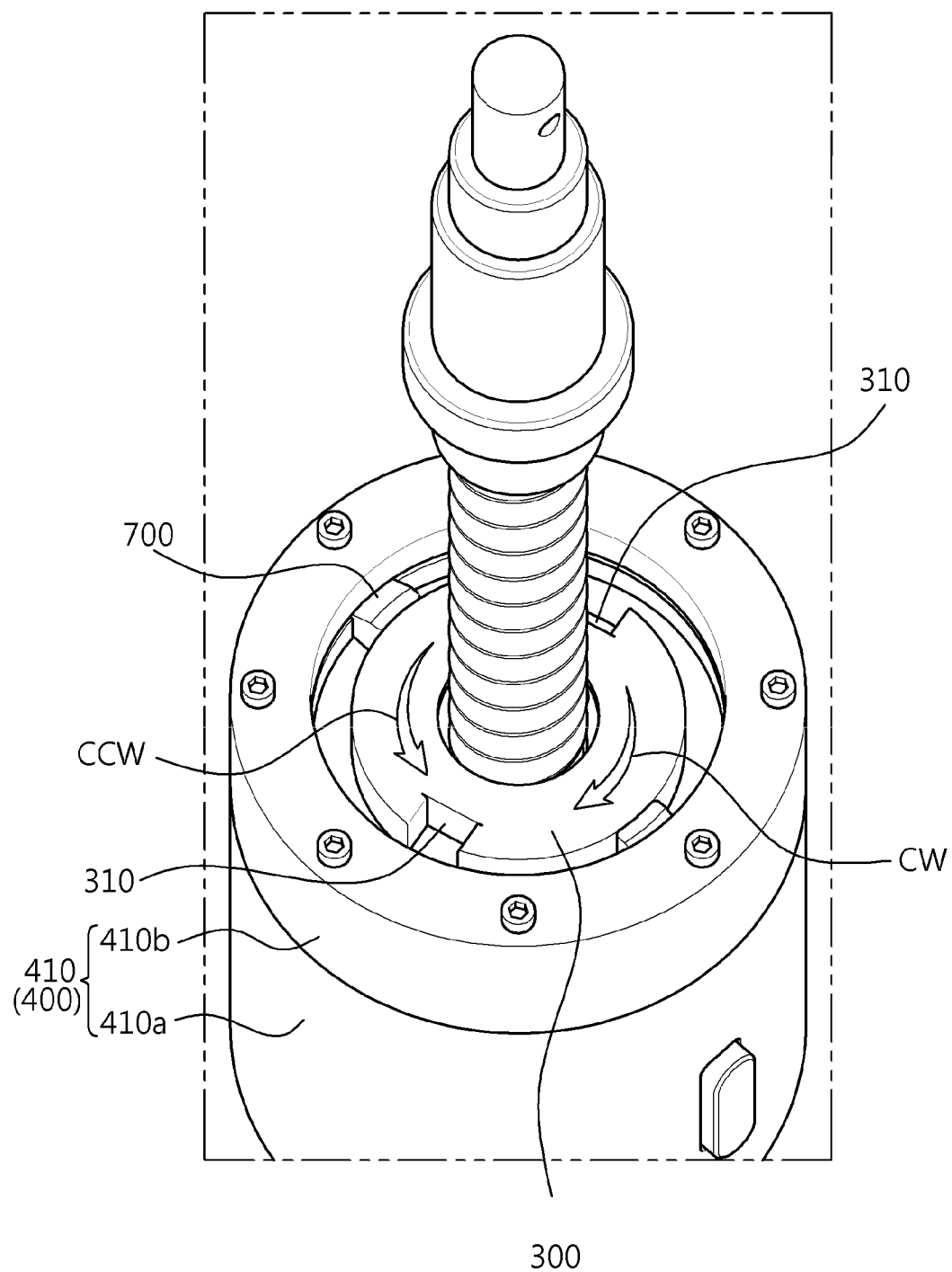
FIGS. 7 and 8 are perspective views illustrating an exemplary operation of the key member of the embodiment of the linear actuator having a free fall function according to the present invention when the piston-rod member is stretched or compressed after jamming.
Figure 8:
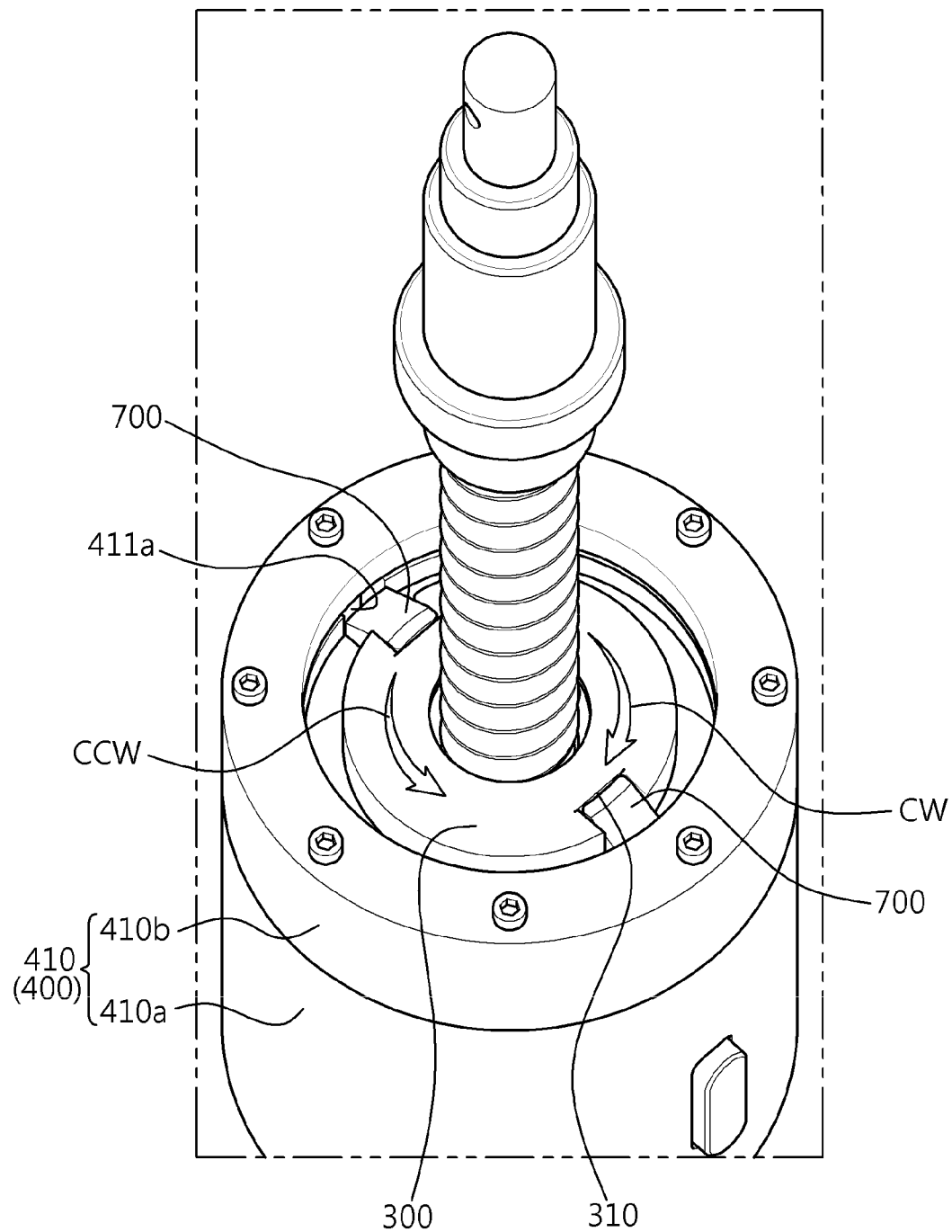

FIG. 5 is an enlarged cross-sectional view of the key portions in the embodiment of the linear actuator having a free fall function according to the present invention, illustrating an embodiment when the piston-rod member 400 is stretched after jamming, and FIGS. 7 and 8 are perspective views illustrating an exemplary operation of the key member 700 of the embodiment of the linear actuator having a free fall function according to the present invention when the piston-rod member 400 is stretched or compressed after jamming.

Hereinafter, the exemplary operation of the linear actuator having a free fall function according to the present invention during rotation of the screw member 200 in the stretching direction of the piston-rod member 400 in the event of jamming in which the screw member 200 and the operating nut 300 are stuck to each other will be described with reference to FIGS. 5, 7, and 8.

In the following embodiment, it will be discussed about an exemplary case in which the piston-rod member 400 is moved forwards and stretched in response to the screw member 200 being rotated clockwise by torque transferred thereto from the rotary motor 500 and the piston-rod member 400 is moved backwards and contracted in response to the screw member 200 being rotated counterclockwise.

In the case of jamming in which the screw member 200 and the operating nut 300 are stuck to each other, when the screw member 200 is rotated clockwise to stretch the piston-rod member 400, the operating nut 300 is rotated clockwise together with the screw member 200.

As the screw member 200 and the operating nut 300 stuck to each other rotate clockwise, the rotary roller members 900 rotate counterclockwise about their own axes while revolving clockwise along the second thread portion 411c together with the operating nut 300.

In addition, the piston-rod member 400 moves in a stretching direction in response to the rotation and revolution of the rotary roller members 900 engaged with the second thread portion 411c. As the piston-rod member 400 moves in the stretching direction, force F is applied to the first slope 710 of the key member 700 in a perpendicular direction.

The force F is divided into an X-axis force $F_x$ in the direction in which the piston rod is stretched and a Y-axis force $F_y$ in the axial direction of the screw member 200. The key member 700 is moved in a +X-axis direction by the X-axis force $F_x$.

The key member 700 moving in the stretching direction applies the X-axis force $F_x$ to the key-supporting washer 820 to compress the spring 810. The compressed spring 810 produces reaction force $F_s$ in an X-axis direction, by which movement of the key member 700 is hindered. At the same time, as the jammed components, i.e. the screw member 200 and the operating nut 300, rotate clockwise, the second key insertion recess 310 is located in alignment with the key member 700, and the key member 700 is located in alignment with the second key insertion recess 310. Then, due to the Y-axis force $F_y$ in the axial direction of the screw member 200, the key member 700 is released from the first key insertion recess 411a and is inserted into the second key insertion recess 310.

As the key member 700 is inserted into the second key insertion recess 310, the piston-rod member 400 can be separated from the operating nut 300 to freely move in the stretching direction, i.e. the advancing direction.

Since the piston-rod member 400 is connected to the operating body via the connector 400a on the end portion, the piston-rod member 400 is subjected to force in the stretching direction, i.e. the advancing direction, due to the load of the operating body. Thus, as the rotary roller members 900 capable of reverse driving rotate, the piston portion 410 moves to the top dead point, at which the piston portion 410 collides against one end portion of the cylinder body 100.

In addition, when the piston portion 410 collides against one end portion of the cylinder body 100 due to the free fall of the piston-rod member 400, the load-locking catch member 1100 is inserted into the rod-locking catch recess 422, thereby fixing the position of the stretched piston-rod member 400.

Here, the screw member 200 and the operating nut 300 are rotated or stopped in previous positions, depending on whether or not the rotary motor 500 rotates.

Figure 6:
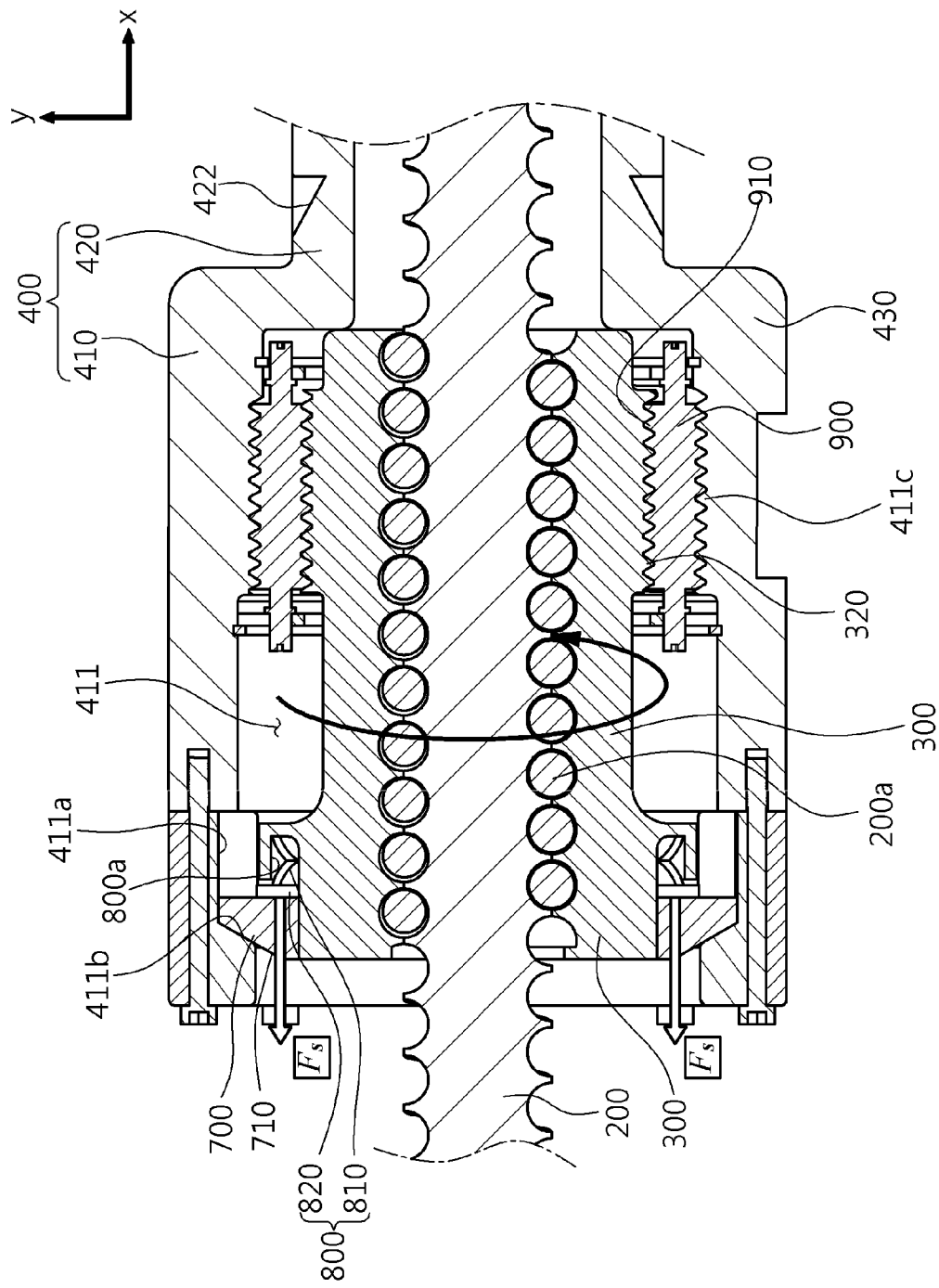
FIG. 6 is an enlarged cross-sectional view of the key portions in the embodiment of the linear actuator having a free fall function according to the present invention, illustrating an embodiment when the piston-rod member is compressed after jamming.

FIG. 6 is an enlarged cross-sectional view of the key portions in the embodiment of the linear actuator having a free fall function according to the present invention, illustrating an embodiment when the piston-rod member 400 is compressed after jamming, and FIGS. 7 and 8 are perspective views illustrating an exemplary operation of the key member 700 of the embodiment of the linear actuator having a free fall function according to the present invention when the piston-rod member 400 is stretched or compressed after jamming.

Hereinafter, the exemplary operation of the linear actuator having a free fall function according to the present invention when the screw member 200 is rotated in a direction in which the piston-rod member 400 is compressed in the event of jamming in which the screw member 200 and the operating nut 300 are stuck to each other will be described in detail with reference to FIGS. 6, 7, and 8.

In the event of jamming in which the screw member 200 and the operating nut 300 are stuck to each other, when the screw member 200 is rotated counterclockwise to compress the piston-rod member 400, the operating nut 300 is rotated counterclockwise together with the screw member 200.

In addition, in response to rotation and revolution of the rotary roller members 900 engaged with the second thread portion 411c, the piston-rod member 400 is moved in the compression direction. As the piston-rod member 400 is moved in the compression direction, the operating nut 300 comes into contact with the stepped portion at the boundary between the piston portion 410 and the rod portion 420, so that the piston-rod member 400 is stopped.

Although the piston-rod member 400 is stopped, the operating nut 300 is inclined to rotate to an angle of rotation proportional to a value obtained by dividing a clearance between the operating nut 300 and the rotary roller members 900 with a lead. This consequently causes the rotary roller members 900 between the piston-rod member 400 and the operating nut 300 to rotate.

However, a significant amount of friction is produced between the rotary roller members 900, which are inclined to rotate, and the piston-rod member 400, which is stationary, to stop the rotary roller members 900 quickly.

In addition, between the rotary roller members 900, which are stationary, and the operating nut 300, which is rotating, a significant amount of friction is produced between the screw member 200, i.e. a ball screw, and the operating nut 300, thereby stopping the operating nut 300.

Although the piston-rod member 400 is in contact with the operating nut 300, the key member 700 maintains contact between the piston-rod member 400 and the operating nut 300, using the X-axial direction reaction force $F_s$ occurring in the key-supporting washer 820.

In addition, as the operating nut 300 rotates counterclockwise, the second key insertion recess 310 is located in alignment with the key member 700. When the key member 700 is located in alignment with the second key insertion recess 310, the reaction force $F_s$ causes the key member 700 to move along the second slope 411b so as to be released from the first key insertion recess 411a and be inserted into the second key insertion recess 310.

As the key member 700 is inserted into the second key insertion recess 310, the piston-rod member 400 can be separated from the operating nut 300 to freely move in the stretching direction, i.e. the advancing direction.

Figure 9:
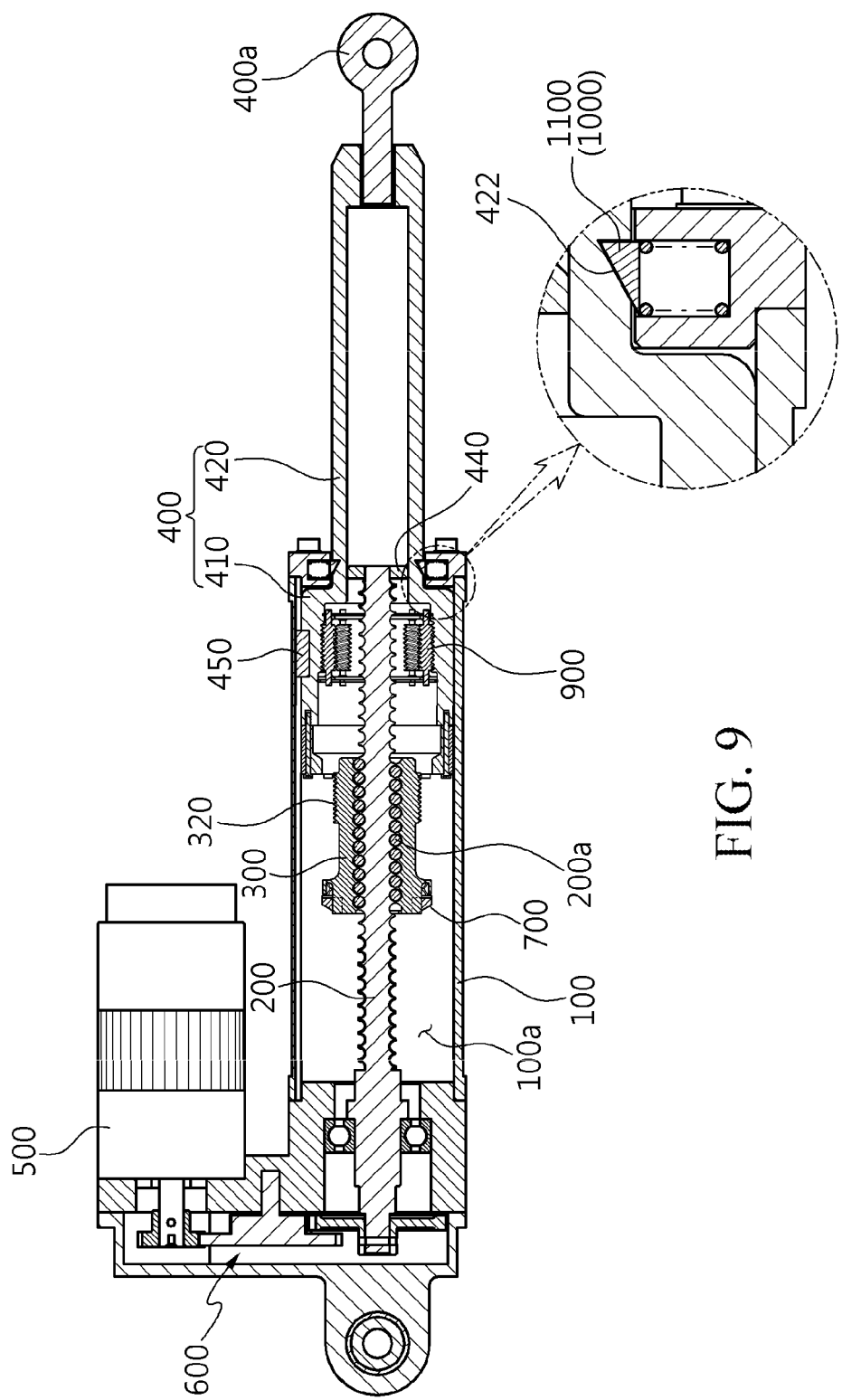
FIG. 9 is a cross-sectional view illustrating an exemplary case in which the piston-rod member has freely fallen while being stretched or compressed after jamming in the embodiment of the linear actuator having a free fall function according to the present invention.

FIG. 9 is a cross-sectional view illustrating an exemplary case in which the piston-rod member has freely fallen while being stretched or compressed after jamming in the embodiment of the linear actuator having a free fall function according to the present invention.

Referring to FIG. 9, the piston-rod member 400 is connected to the operating body via the connector 400a on the end portion is subjected to force in the stretching direction, i.e. the advancing direction, due to the load of the operating body, since the piston-rod member 400 is connected to the operating body via the connector 400a on the end portion. Thus, as the rotary roller members 900, capable of reverse driving, rotate, the piston portion 410 moves to the top end point at which the piston portion 410 collides against one end portion of the cylinder body 100.

In addition, when the piston portion 410 collides against one end portion of the cylinder body 100 due to the free fall of the piston-rod member 400, the load-locking catch member 1100 fixes the position of the piston-rod member 400 that has been inserted into the rod-locking catch recess 422 to be stretched.

Here, the screw member 200 and the operating nut 300 are rotated or sopped in previous positions, depending on whether or not the rotary motor 500 rotates.

Figure 10:
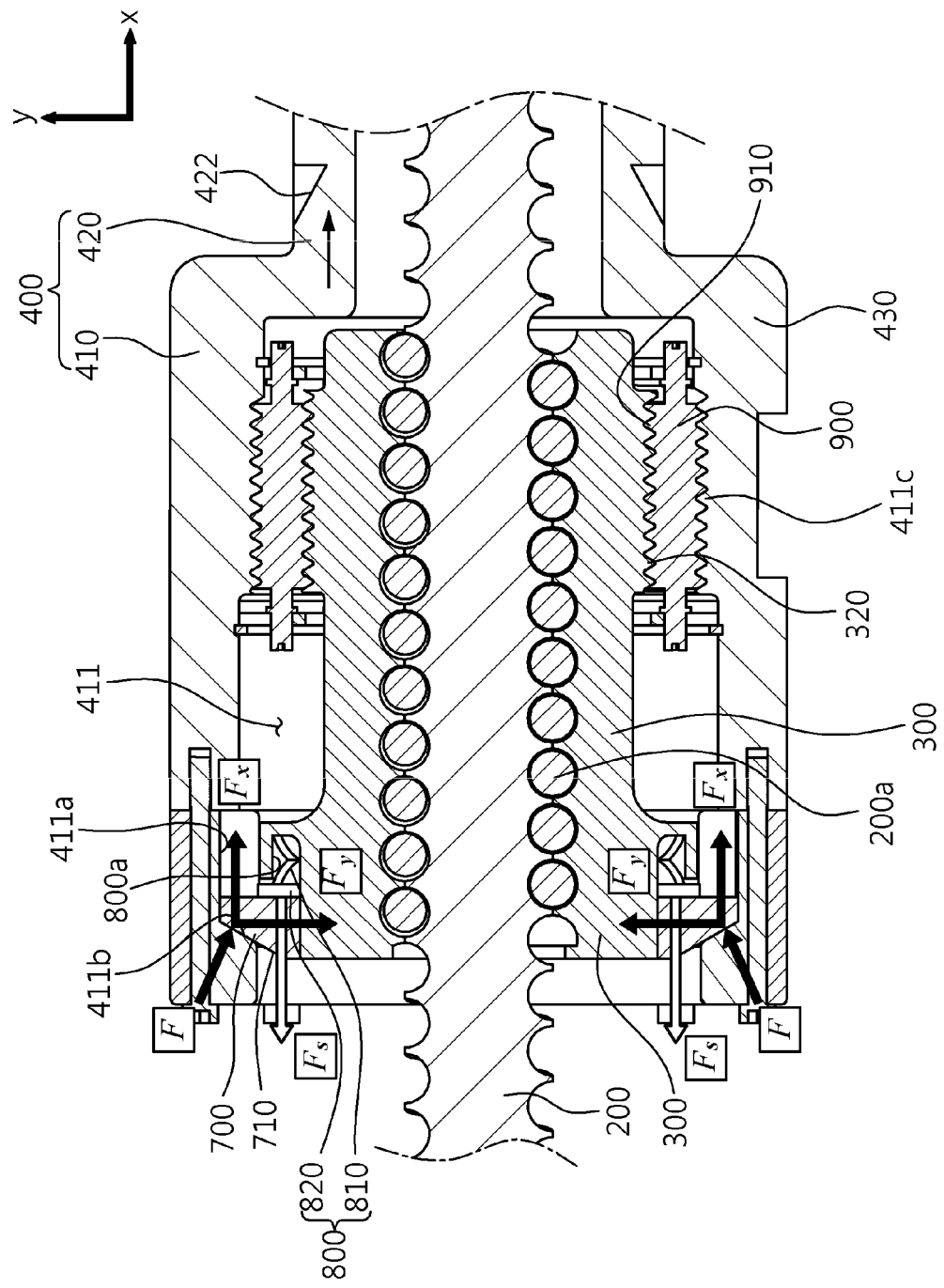
FIG. 10 is an enlarged cross-sectional view of the key portions of the embodiment of the linear actuator having a free fall function according to the present invention, illustrating an exemplary operation in an unintended situation when the piston-rod member is ordinarily stretched.

FIG. 10 is an enlarged cross-sectional view of the key portions of the embodiment of the linear actuator having a free fall function according to the present invention, illustrating an exemplary operation in an unintended situation when the piston-rod member 400 is ordinarily stretched.

Hereinafter, an exemplary operation in the stretching direction in a case in which torque necessary for rotation of the screw member 200 is generated to be smaller than minimum torque for linear movement of the operating nut 300 when the operating nut 300 rotates clockwise to linearly move the piston-rod member 400 in the stretching direction will be described in detail with reference to FIG. 10.

The torque generated by the rotary motor 500 is amplified by the gear structure to rotate the screw member 200. When the operating nut 300 rotates clockwise to linearly move the piston-rod member 400 in the stretching direction, the torque necessary for rotation of the screw member 200 must smaller than the torque necessary for linear movement of the operating nut 300 so that the operating nut 300 can rotate.

When the operating nut 300 rotates, the rotary roller members 900 are rotated by rotation of the operating nut 300, and the piston-rod member 400 is linearly moved in the stretching direction.

As the piston-rod member 400 linearly moves in the stretching direction, force F is applied to the first slope 710 of the key member 700 in a perpendicular direction.

The force F is divided into an X-axis force $F_x$ in the direction in which the piston rod is stretched and a Y-axis force $F_y$ in the axial direction of the screw member 200. The key member 700 is moved in a +X-axis direction by the X-axis force $F_x$.

The key member 700 moving in the stretching direction applies the X-axis force $F_x$ to the key-supporting washer 820 to compress the spring 810. The compressed spring 810 produces reaction force $F_s$ in an X-axis direction. The reaction force $F_s$ hinders movement of the piston-rod member 400 in the stretching direction.

In addition, the Y-axis force $F_y$, i.e. a vertical component of the force F acting on the first slope 710f the key member 700, increases friction between the key member 700 and the operating nut 300, thereby hindering rotation of the operating nut 300.

Minimum torque necessary for linear movement of the operating nut 300 is determined by friction between the screw member 200 and the operating nut 300. Since the necessary minimum torque is significantly smaller than torque necessary for rotation of the operating nut 300 due to rolling contact of the balls 200a in the operating nut 300, the operating nut 300 linearly moves instead of rotating when the screw member 200 rotates.

Accordingly, as the screw member 200 rotates clockwise, the piston-rod member 400 linearly moves in the stretching direction.

Figure 11:
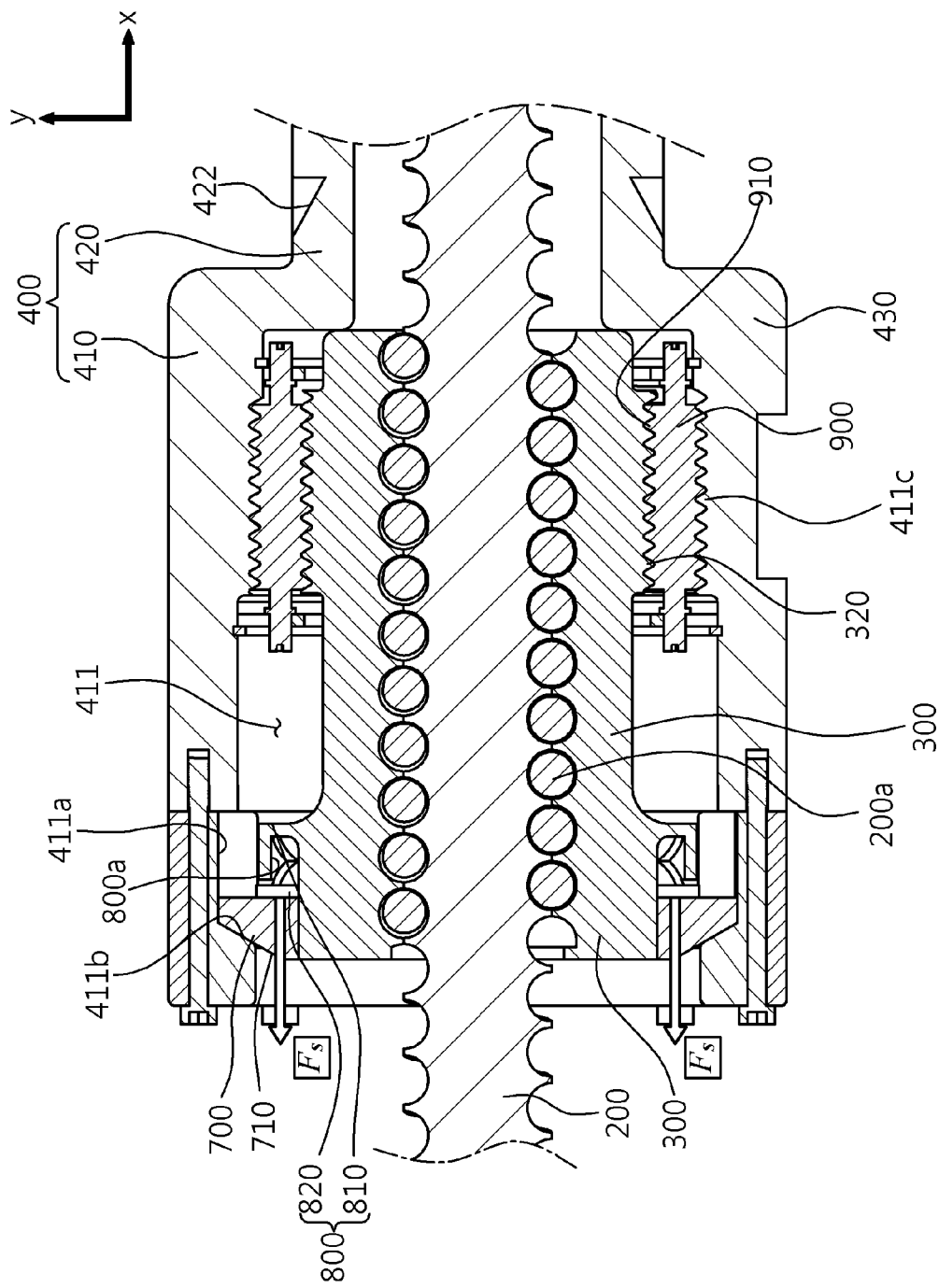
FIG. 11 is an enlarged cross-sectional view of the key portions of the embodiment of the linear actuator having a free fall function according to the present invention, illustrating an exemplary operation in an unintended situation when the piston-rod member is ordinarily compressed.

FIG. 11 is an enlarged cross-sectional view of the key portions of the embodiment of the linear actuator having a free fall function according to the present invention, illustrating an exemplary operation in an unintended situation when the piston-rod member 400 is ordinarily compressed.

Hereinafter, an exemplary operation in the compression direction in a case in which torque necessary for rotation of the screw member 200 is generated to be smaller than minimum torque for linear movement of the operating nut 300 when the operating nut 300 rotates counterclockwise to linearly move the piston-rod member 400 in the compression direction will be described in detail with reference to FIG. 11.

The torque generated by the rotary motor 500 is amplified by the gear structure to rotate the screw member 200. When the operating nut 300 rotates counterclockwise to linearly move the piston-rod member 400 in the compression direction, the torque necessary for rotation of the screw member 200 must smaller than the torque necessary for linear movement of the operating nut 300 so that the operating nut 300 can rotate.

When the operating nut 300 rotates, the rotary roller members 900 are rotated by rotation of the operating nut 300, and the piston-rod member 400 is linearly moved in the compression direction.

As the piston-rod member 400 linearly moves in the compression direction, the operating nut 300 adjoins the stepped portion at the boundary between the piston portion 410 and the rod portion 420, and the piston-rod member 400 is stopped.

Although the piston-rod member 400 is stopped, the operating nut 300 is inclined to rotate to an angle of rotation proportional to a value obtained by dividing a clearance between the operating nut 300 and the rotary roller members 900 with a lead. This consequently causes the rotary roller members 900 between the piston-rod member 400 and the operating nut 300 to rotate.

However, a significant amount of friction is generated between the rotary roller members 900, which are inclined to rotate, and the piston-rod member 400, which is stationary, to stop the rotary roller members 900.

Since the friction between the rotary roller members 900, which are stationary, and the operating nut 300, which is inclined to rotate, is significantly greater than the friction between the screw member 200 and the operating nut 300, the operating nut 300 linearly moves instead of rotating when the screw member 200 rotates.

As the piston-rod member 400 is in contact with the operating nut 300, relative positions of the two components are changed. However, the key member 700 remains in contact with the second slope 411b of the piston portion 410, using spring reaction force $F_s$ of the key-supporting washer 820.

When the screw member 200 rotates, the operating nut 300 linearly moves instead of rotating.

Accordingly, as the screw member 200 rotates counterclockwise, the piston-rod member 400 linearly moves in the compression direction.

According to the present invention, in the event of jamming in which the piston-rod member 400 is stopped due to sticking between the operating nut 300 and the screw member 200, the piston-rod member 400 can freely fall in a direction in which load is applied. This can obtain the maximum stretched length of the piston-rod member 400, thereby providing safety in an emergency.

In particular, the present invention can be applied to a linear actuator configured to protrude and retract a landing gear of an aircraft. In the event of jamming, the maximum stretched length of the piston-rod member 400 can be obtained, so that the landing gear main remain in the protruding position. This can consequently prevent a disaster from being caused by the malfunction of the landing gear, thereby significantly improving the reliability of the aircraft.

It should be understood that the present invention is not limited to the foregoing embodiments and various modifications, additions and substitutions are possible, without departing from the scope and spirit of the present invention.

The invention claimed is:

1. A linear actuator comprising:
a screw member rotatably provided within a cylinder body having a cylinder chamber therein;
an operating nut extending around and screw coupled to the screw member, the operating nut being moved back and forth by rotation of the screw member;
a piston-rod member separably coupled to the operating nut within the cylinder chamber and protruding from one portion of the cylinder body, the piston-rod member being moved back and forth integrally with the operating nut; and
a rotary motor disposed on the cylinder body to rotate the screw member,
wherein, when the operating nut and the screw are stuck to and rotate integrally with each other, the piston-rod member is decoupled from the operating nut to advance in a direction in which load is applied,
wherein the piston-rod member comprises a piston portion linearly moving in contact with an inner wall of the cylinder chamber and a rod portion having a diameter smaller than a diameter of the piston portion and protruding through one portion of the cylinder chamber,
a nut receptacle is provided within the piston portion, with the operating nut being separably coupled to the nut receptacle, and a screw receptacle is provided within the rod portion to communicate with the nut receptacle, the screw receptacle allowing one end portion of the screw member to be inserted thereinto, and a key member is provided on an outer circumferential surface of the operating nut and located to be caught by an inner circumferential surface of the nut receptacle, the key member being released from a caught position when the operating nut and the screw member are fixed to and rotate integrally with each other, and wherein a first key insertion recess is provided in the inner circumferential surface of the nut receptacle, with one end portion of the key member being inserted into the first key insertion recess portion, and is located such that one end thereof is inserted into the first key insertion recess portion and the other end thereof supports the outer circumferential surface of the operating nut, a second key insertion recess is provided in the outer circumferential surface of the operating nut, allowing the other end of the key member to be inserted thereinto when the operating nut rotates, and when the operating nut is rotated integrally with the screw member, so that the other end portion is located in the second key insertion recess, one end portion of the key member is pushed and released from the first key insertion recess and the other end portion of the key member is inserted into the second key insertion recess.

2. The linear actuator according to claim 1, wherein the operating nut is provided with a key elastic support elastically supporting the key member by pushing the key member in a direction of the other portion, the key elastic support comprising a spring provided on the outer circumferential surface of the operating nut and inserted into a spring receptacle open in the direction of the other portion and a key-supporting washer in close contact with the key member and elastically supported by the spring.

3. The linear actuator according to claim 1, wherein the key member comprises a first slope provided on a surface of the other portion thereof and a second slope corresponding to the first slope and provided on a surface of the first key insertion recess facing the first slope, wherein the key member is allowed to be pushed and moved along the second slope when the piston-rod member or the operating nut is subjected to force in an advancing or retreating direction.

4. The linear actuator according to claim 1, wherein the operating nut is located within the nut receptacle to be spaced apart from the piston portion, and rotary roller members are rotatably located between the operating nut and the nut receptacle, the rotary roller members being screw-coupled to the outer circumferential surface of the operating nut and the inner circumferential surface of the nut receptacle.

5. The linear actuator according to claim 4, wherein a first thread portion is provided on an outer circumferential surface of each of the rotary roller members, a second thread portion is provided on an inner circumferential surface of the nut receptacle to be screw-coupled to the first thread portion, and a third thread portion is provided on the outer circumferential surface of the operating nut to be screw-coupled to the first thread portion, and the rotary roller members are screw-coupled to the outer circumferential surface of the operating nut and the inner circumferential surface of the nut receptacle.

6. The linear actuator according to claim 1, further comprising a load-locking unit fixing a position of the piston-rod member in a position in which the piston-rod member has freely fallen and advanced in the direction in which load is applied.

7. The linear actuator according to claim 6, wherein the load-locking unit is configured to catch and fix the piston-rod member when the piston-rod member is in contact with one end portion of the cylinder body and is stretched a maximum length after having freely fallen.

8. The linear actuator according to claim 6, wherein the load-locking unit comprises a load-locking catch member provided on one end portion of the cylinder body, the load-locking catch member being elastically supported by a spring such that the load-locking catch member is able to protrude to an inner circumferential surface of a load hole through which the rod portion extends, and the rod portion comprises a rod-locking catch recess configured to catch the rod-locking catch member inserted thereinto.

* * * * *